(12) United States Patent
Yin et al.

(10) Patent No.: US 9,423,912 B2
(45) Date of Patent: Aug. 23, 2016

(54) TOUCH PANEL

(71) Applicant: TPK HOLDING CO., LTD., Cayman (KY)

(72) Inventors: Hsiang-Wei Yin, Taichung (TW);
Ming-Kung Wu, Taichung (TW);
Shin-Chieh Huang, Taichung (TW);
Hsuan-Ta Chen, Keelung (TW);
Yu-Ting Lin, New Taipei (TW);
Chih-Hsien Lien, Taichung (TW);
Wei-Min Chen, Taichung (TW);
Wei-Chih Hsu, Taichung (TW);
Su-Ming Lin, Taichung (TW);
Peng-Chih Yu, Taichung (TW);
Ping-Wen Huang, Taichung (TW)

(73) Assignee: TPK Holding Co., Ltd., Cayman (KY)

( * ) Notice: Subject to any disclaimer, the term of this patent is extended or adjusted under 35 U.S.C. 154(b) by 520 days.

(21) Appl. No.: 13/733,909

(22) Filed: Jan. 4, 2013

(65) Prior Publication Data

US 2013/0169597 A1 Jul. 4, 2013

(30) Foreign Application Priority Data

Jan. 4, 2012 (TW) .............................. 101100338 A

(51) Int. Cl.
*G06F 3/045* (2006.01)
*G06F 3/042* (2006.01)
*G06F 3/041* (2006.01)

(52) U.S. Cl.
CPC ................ *G06F 3/042* (2013.01); *G06F 3/041* (2013.01); *G06F 2203/04103* (2013.01)

(58) Field of Classification Search
None
See application file for complete search history.

(56) References Cited

U.S. PATENT DOCUMENTS

| 2010/0164896 | A1* | 7/2010 | Nakayama | G06F 3/044 345/173 |
| 2010/0225612 | A1* | 9/2010 | Ishizaki | G02F 1/13338 345/174 |
| 2010/0265193 | A1* | 10/2010 | Kung | G06F 3/044 345/173 |
| 2011/0102364 | A1* | 5/2011 | Lin | G06F 3/044 345/174 |
| 2011/0298739 | A1* | 12/2011 | Wu | G06F 3/041 345/173 |

FOREIGN PATENT DOCUMENTS

TW    I333218    11/2010

* cited by examiner

*Primary Examiner* — Joseph Haley
*Assistant Examiner* — Ifedayo Iluyomade
(74) *Attorney, Agent, or Firm* — Cooper Legal Group LLC

(57) ABSTRACT

A touch panel includes a substrate, a touch sensing electrode, and an optical compensation layer. The touch sensing electrode is disposed on the substrate. The optical compensation layer is disposed on the substrate and covers the touch sensing electrode. A refraction index of the optical compensation layer is smaller than or equal to a refraction index of the touch sensing electrode.

8 Claims, 8 Drawing Sheets

TOUCH PANEL

BACKGROUND OF THE INVENTION

1. Field of the Invention

The present invention relates to a touch panel, and more particularly, to a touch panel including an optical compensation layer to improve an appearance quality of the touch panel.

2. Description of the Prior Art

In recent years, touch sensing technologies have developed flourishingly, and electronic products, such as mobile phones, tablet PCs, GPS navigator systems, laptop PCs, and desktop PCs, which have both the touch sensing function and the display function, are commercialized accordingly. There are many diverse technologies of touch panel, such as the resistance touch technology, the capacitive touch technology and the optical touch technology which are the main touch technologies in use. The capacitive touch technology has become the mainstream touch technology for the high-end and the mid-end consumer electronics, because the capacitive touch panel has advantages such as high precision, multi-touch property, better endurance, and higher touch resolution.

In the capacitive touch technology, transparent sensing electrodes are used to detect the variations of electrical capacitances around a touch point, and feedback signals are transmitted via connecting lines, which interconnect all of the transparent sensing electrodes along different axis directions to locate the touch points. In the conventional capacitive touch technology, the transparent sensing electrodes are made of transparent conductive materials such as indium tin oxide (ITO) which is a material with a high refractive index (about 1.7 to 2.0) but still may absorb some light. Therefore, a visual difference may be generated between a region with the transparent sensing electrodes and a region without the transparent sensing electrodes, an issue of visible transparent sensing electrodes may occur, and an appearance quality of the touch panel may accordingly be affected. In addition, the issue of visible transparent sensing electrodes may become more serious in large size touch panels because a thickness of the transparent sensing electrode has to be thicker to lower the total resistance for the driving requirement. For example, when a size of the normal touch panel is larger than 7 inches, the thickness of the transparent sensing electrode may have to be thicker than 90 nanometers to lower the total resistance, and the issue of visible transparent sensing electrodes may become more serious. In the conventional capacitive touch panel, a silicon oxide layer or an organic photo resist layer are generally used to cover the transparent sensing electrode. Since a refraction index of the silicon oxide layer or the organic photo resist layer of about 1.5 is apparently different from the refraction index of ITO, the silicon oxide layer or the organic photo resist layer may only be employed to protect or insulate the transparent sensing electrode from other things, and the issue of visible transparent sensing electrodes may not be improved with the silicon oxide layer or the organic photo resist layer.

SUMMARY OF THE INVENTION

It is one of the objectives of the present invention to provide a touch panel. An optical compensation layer is disposed in the touch panel. Differences of refraction index and chromaticity between a region with transparent sensing electrodes and a region without the transparent sensing electrodes may become minor under interference of light, an issue of visible transparent sensing electrodes in the touch panel may be accordingly reduced and a transmittance of the touch panel may be accordingly enhanced.

To achieve the purposes described above, a preferred embodiment of the present invention provides a touch panel. The touch panel includes a substrate, a touch sensing electrode, and an optical compensation layer. The touch sensing electrode is disposed on the substrate. The optical compensation layer is disposed on the substrate and covers the touch sensing electrode. A refraction index of the optical compensation layer is smaller than or equal to a refraction index of the touch sensing electrode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
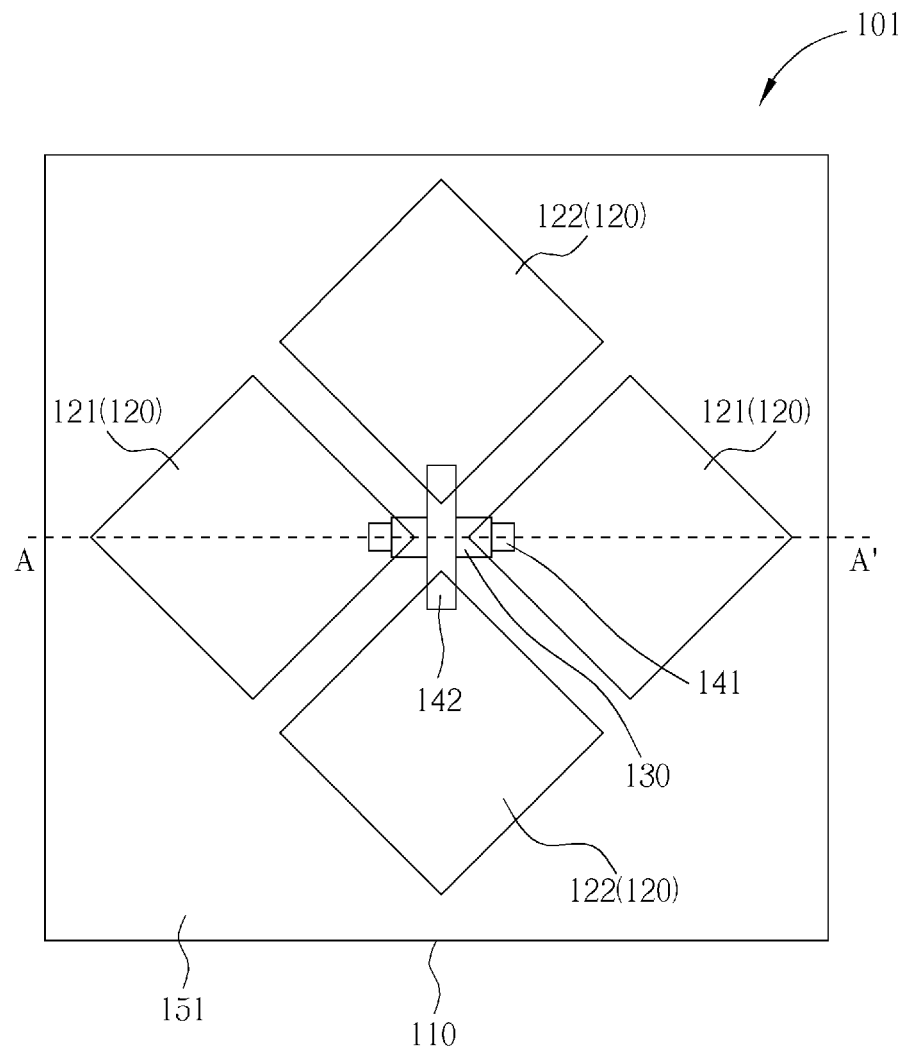
FIG. 1 and FIG. 2 are schematic diagrams illustrating a touch panel according to a first preferred embodiment of the present invention.

Certain terms are used throughout the description and following claims to refer to particular components. As one skilled in the art will understand, electronic equipment manufacturers may refer to a component by different names. This document does not intend to distinguish components that differ in name but not function. In the following description and in the claims, the term "include" is used in an open-ended fashion, and thus should be interpreted to mean "include, but not limited to . . . " In addition, to simplify the descriptions and make it more convenient to compare embodiments between each other, identical components are marked with the same reference numerals in each of the following embodiments. Please note that the figures are only for illustration and the figures may not be to scale. Additionally, the terms such as "first" and "second" in this context are only used to distinguish different components and do not constrain the order of generation.

Figure 2:
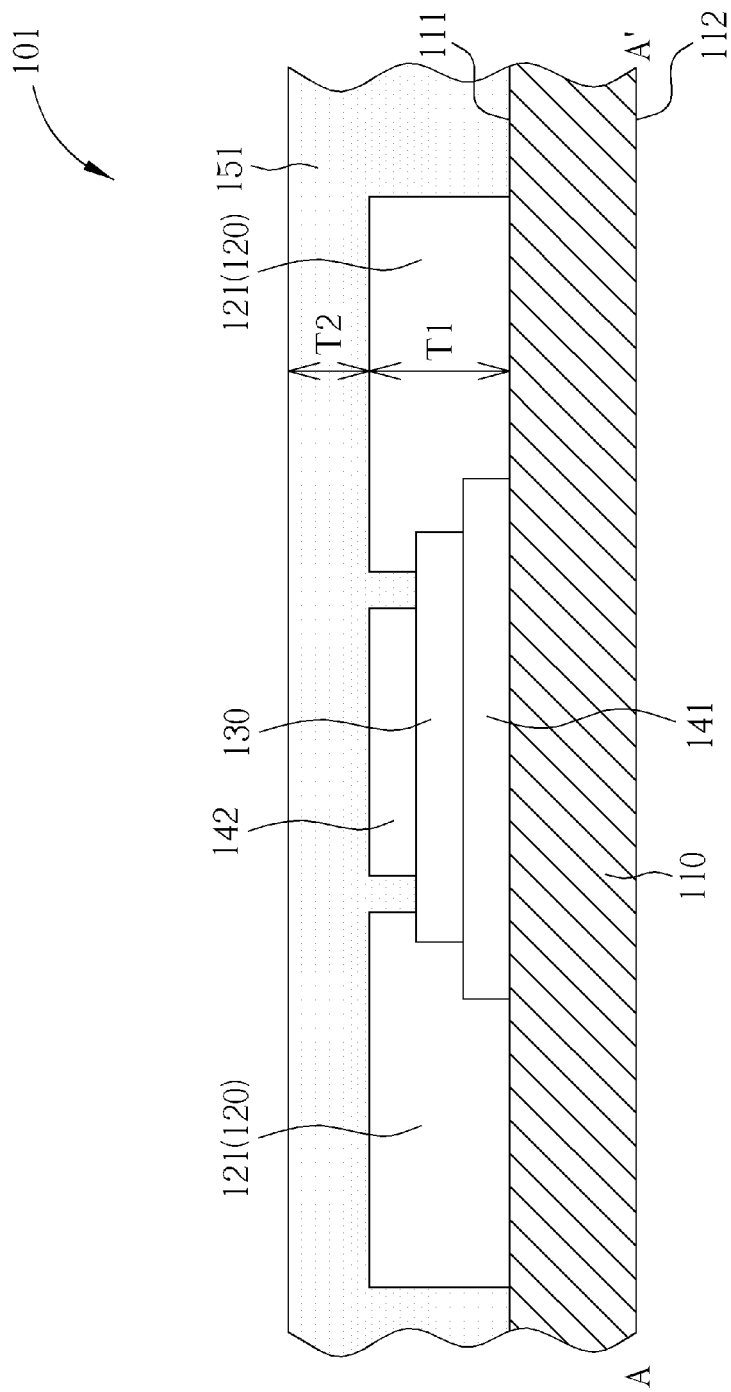

Please refer to FIG. 1 and FIG. 2. FIG. 1 and FIG. 2 are schematic diagrams illustrating a touch panel according to a first preferred embodiment of the present invention. FIG. 1 is a top-view diagram. FIG. 2 is a cross-sectional view diagram taken along a cross-sectional line A-A' in FIG. 1. Please note that the figures are only for illustration and the figures may not be to scale. The scale may be further modified according to different design considerations. As shown in FIG. 1 and FIG. 2, the first preferred embodiment of the present invention provides a touch panel 101. The touch panel 101 includes a substrate 110, a touch sensing electrode 120, and an optical compensation layer 151. The touch sensing electrode 120 is disposed on the substrate 110. More specifically, the touch sensing electrode 120 in this embodiment includes a plurality of first axis sensing electrodes 121 and a plurality of second axis sensing electrodes 122. The first axis sensing electrodes 121 and the second axis sensing electrodes 122 are disposed on a first surface 111 of the substrate 110. In this embodiment, the first axis sensing electrodes 121 and the second axis sensing electrodes 122 are preferably made of a transparent conductive material, such as indium tin oxide (ITO), indium zinc oxide (IZO), or aluminum zinc oxide (AZO), but not limited thereto. In addition, the touch sensing electrode 120 is not limited to a structure of multi-layer transparent electrodes, such as the first axis sensing electrodes 121 and the second axis sensing electrodes 122 mentioned above, and the touch sensing electrode 120 in this invention may also be a structure of a single layer transparent electrode, and the sensing electrode may include a diamond shape electrode, a triangle electrode, a linear electrode, or other electrodes with irregular shapes. The optical compensation layer 151 is disposed on the substrate 110 and covers the touch sensing electrode 120, i.e. the optical compensation layer 151 covers the first axis sensing electrodes 121 and the second axis sensing electrodes 122. A refraction index of the optical compensation layer 151 is smaller than or equal to a refraction index of the touch sensing electrode 120. In other words, the refraction index of the optical compensation layer 151 is smaller than or equal to a refraction index of the first axis sensing electrodes 121 and the second axis sensing electrodes 122. Additionally, the optical compensation layer 151 may include organic materials, such as polyimide (PI) and acrylic resin, inorganic materials, such as titanium oxide, a single layer structure of the above-mentioned materials, or a stack layer of the above-mentioned materials, but the present invention is not limited to this, and the optical compensation layer 151 may be further modified according to different required refraction indexes. In this embodiment, the optical compensation layer 151 may be formed by dry coating methods, such as chemical vapor deposition (CVD), or wet coating methods, such as spin on coating, but not limited thereto.

In this embodiment, the refraction index of the touch sensing electrode 120 is substantially between 1.7 and 2.0, i.e. the refraction indexes of the first axis sensing electrodes 121 and the second axis sensing electrodes 122 are substantially between 1.7 and 2.0. The refraction index of the optical compensation layer 151 is preferably between 1.6 and 1.7. A thickness of the first axis sensing electrode 121 is substantially equal to a thickness of the second axis sensing electrode 122, but not limited thereto. Additionally, a thickness of the touch sensing electrode 120 is substantially between 18 nanometers and 150 nanometers, i.e. the thickness of the first axis sensing electrode 121 and the thickness of the second axis sensing electrode 122 are respectively between 18 nanometers and 150 nanometers. A thickness of the optical compensation layer 151 is between 60 nanometers and 150 nanometers. In other preferred embodiments of the present invention, the thickness of the touch sensing electrode 120 may be larger than 90 nanometers, but not limited thereto. More specifically, a thickness of the optical compensation layer 151 covering the first axis sensing electrode 121 and a thickness of the optical compensation layer 151 covering the second axis sensing electrode 122 are preferably between 60 nanometers and 150 nanometers. A preferred optical effect may be accordingly generated by controlling the thicknesses and the refraction indexes described above. For example, please refer to Table 1 and FIG. 2. Table 1 shows a transmittance of the touch panel 101, differences of reflection rate, and color differences between a region with the first axis sensing electrodes 121 and the second axis sensing electrodes 122 and a region without the first axis sensing electrodes 121 and the second axis sensing electrodes 122 when the optical compensation layer 151 with a refraction index equal to 1.65 is employed in the touch panel 101. In addition, Table 1 also shows a transmittance of conventional touch panel with a silicon oxide layer covering the sensing electrodes, differences of reflection rate, and color differences between a region with the sensing electrodes and a region without the sensing electrodes in the conventional touch panel. A thickness T1 represents the thickness of the first axis sensing electrode 121.

TABLE 1

| | Optical Compensation Layer (Refraction Index = 1.65) | | | Silicon Oxide Layer (Refraction Index = 1.46) | | |
|---|---|---|---|---|---|---|
| Thickness T1 (nm) | 90 | 110 | 130 | 90 | 110 | 130 |
| Difference of Reflection Rate (%) | 0.18 | −0.21 | 0.4 | 2.86 | 1.76 | 1.52 |
| Color Difference (delta E) | 1.8 | 1.32 | 3.28 | 7.6 | 8.92 | 7.19 |
| Transmittance (%) | 89.9 | — | — | 85.8 | — | — |

As shown in Table 1, when the optical compensation layer 151 with the refraction index equal to 1.65 is employed in the touch panel 101, the differences of reflection rate, and the color differences between the region with the first axis sensing electrodes 121 and the second axis sensing electrodes 122 and the region without the first axis sensing electrodes 121 and the second axis sensing electrodes 122 may be apparently improved. Therefore, the optical compensation layer 151 may be employed to effectively overcome the issue of the visible transparent sensing electrodes in the touch panel. Additionally, the transmittance of the touch panel may also be enhanced by replacing the conventional silicon oxide layer with the optical compensation layer 151 in the touch panel.

Please refer to Table 2 and FIG. 2. Table 2 shows the differences of reflection rate, and the color differences between the region with the first axis sensing electrodes 121 and the second axis sensing electrodes 122 and the region without the first axis sensing electrodes 121 and the second axis sensing electrodes 122 according to different exemplary embodiments wherein optical compensation layers 151 with different refraction indexes and thicknesses are respectively used. A thickness T1 stands for the thickness of the first axis sensing electrode 121, a thickness T2 stands for the thickness of the optical compensation layer 151 covering the first axis sensing electrode 121, and a refraction index N stands for the refraction index of the optical compensation layer 151.

TABLE 2

| | Exemplary Embodiment | | | |
|---|---|---|---|---|
| | 1 | 2 | 3 | 4 |
| Thickness T1 (nm) | 110 | 110 | 110 | 110 |
| Thickness T2 (nm) | 1200 | 60 | 70 | 80 |
| Refraction Index N | 1.7 | 1.65 | 1.65 | 1.65 |
| Difference of Reflection Rate (%) | 0.06 | −0.21 | −0.33 | −0.36 |
| Color Difference (delta E) | 1.98 | 1.32 | 1.30 | 1.64 |

As shown in Table 2, when the optical compensation layer 151 with the refraction index equal to 1.65 or 1.70 is employed in the touch panel 101, the differences of reflection rate, and the color differences between the region with the first axis sensing electrodes 121 and the second axis sensing electrodes 122 and the region without the first axis sensing electrodes 121 and the second axis sensing electrodes 122 may be apparently improved. In addition, the thickness T2 of the optical compensation layer 151 covering the first axis sensing electrode 121 is preferably between 60 nanometers and 150 nanometers, but the present invention is not limited to this, and the thickness of the optical compensation layer 151 may be further modified according to the refraction index and the thickness of the first axis sensing electrode 121 or the second axis sensing electrode 122. For instance, in the exemplary embodiment 1 in Table 2, an optical compensation layer having a thickness around 1200 nanometers and a refraction index around 1.7 may also be employed to improve the differences of reflection rate and the color differences.

As shown in FIG. 1 and FIG. 2, the touch panel 101 in this embodiment may further include a first connecting line 141, a second connecting line 142, and an insulating layer 130 disposed on the substrate 110. The first connecting line 141 is employed to electrically connect two adjacent first axis sensing electrodes 121, and the second connecting line 142 is employed to electrically connect two adjacent second axis sensing electrodes 122. The insulating layer 130 is disposed between the first connecting line 141 and the second connecting line 142 so as to electrically insulate the first connecting line 141 from the second connecting line 142. In this embodiment, the first connecting line 141 and the second connecting line 142 may include transparent conductive materials such as indium tin oxide, indium zinc oxide, and aluminum zinc oxide, or other appropriate non-transparent conductive materials such as silver (Ag), aluminum (Al), copper (Cu), magnesium (Mg), molybdenum (Mo), a stack layer of the above-mentioned materials, or an alloy of the above-mentioned materials, but not limited thereto. The insulating layer 130 may include inorganic materials, such as silicon nitride, silicon oxide, and silicon oxynitride, organic materials, such as acrylic resin, or other appropriate insulating materials. Additionally, in this embodiment, an insulating film (not shown) may also be selectively disposed between the substrate 110 and the first axis sensing electrode 121 or between the substrate 110 and the second axis sensing electrode 122, or a transparent conductive shielding layer (not shown) and an insulating film (not shown) may be selectively disposed on a second surface 112 of the substrate 110 so as to improve touch operations on the touch panel 101, but not limited thereto. In other embodiments of the present invention, the second connecting line 142 may be formed in a manufacturing process forming the first axis sensing electrode 121 and the second axis sensing electrode 122. In other words, the second connecting line 142 and two adjacent second axis sensing electrode 122 may be formed simultaneously and connected to each other, but the present invention is not limited to this.

The following description will detail the different embodiments of the touch panel in the present invention. To simplify the description, identical components in each of the following embodiments are marked with identical symbols. For making it easier to understand the differences between the embodiments, the following description will detail the dissimilarities among different embodiments and the identical features will not be redundantly described.

Figure 3:
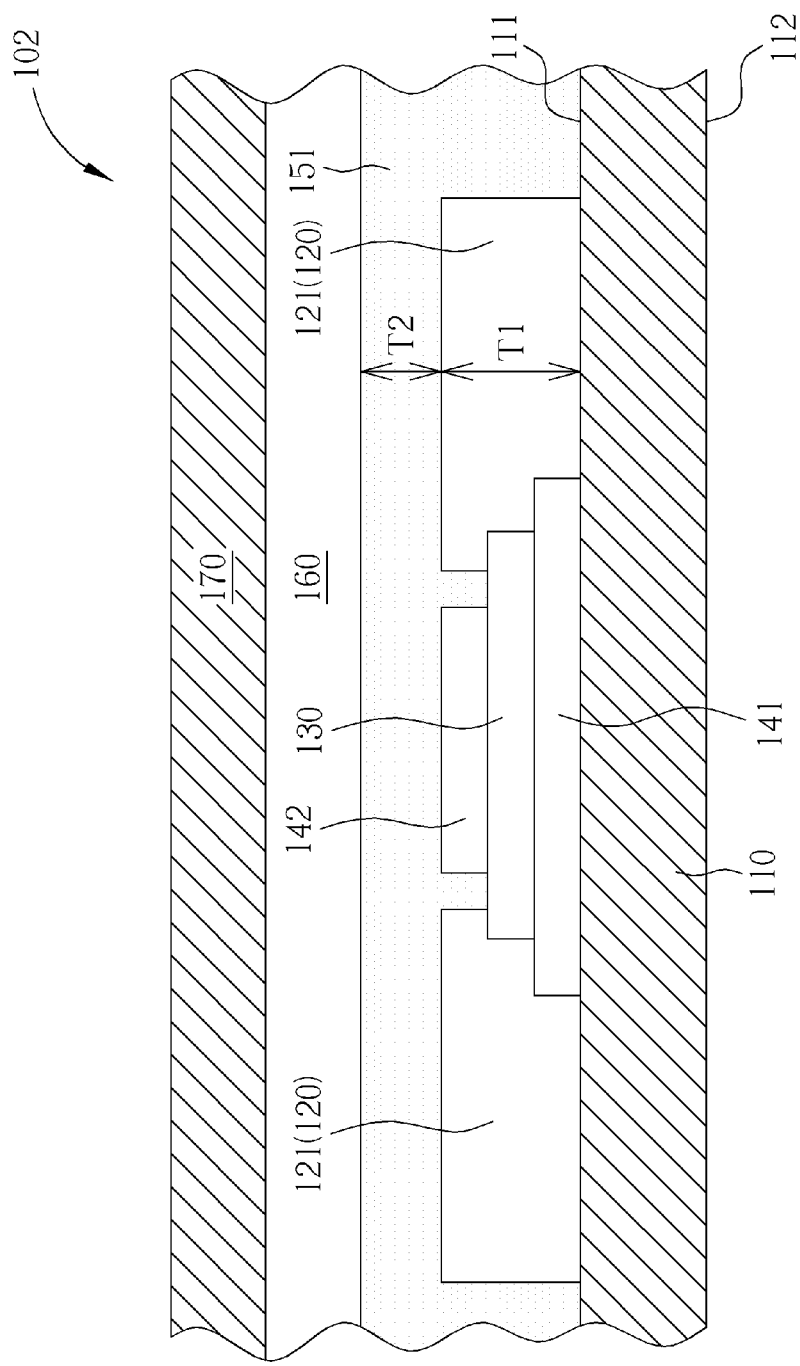
FIG. 3 is a schematic diagram illustrating a touch panel according to a second preferred embodiment of the present invention.

Please refer to FIG. 3. FIG. 3 is a schematic diagram illustrating a touch panel according to a second preferred embodiment of the present invention. As shown in FIG. 3, the difference between a touch panel 102 of this embodiment and the touch panel 101 of the first preferred embodiment is that the touch panel 102 further includes an adhesive layer 160 and a covering substrate 170 disposed on the substrate 110. In this embodiment, the adhesive layer 160 is disposed on the optical compensation layer 151, and the covering substrate 170 is disposed on the adhesive layer 160. In other words, the adhesive layer 160 is disposed between the covering substrate 170 and the optical compensation layer 151 so as to combine the covering substrate 170 and the optical compensation layer 151. The optical compensation layer 151 is disposed between the substrate 110 and the adhesive layer 160, and the optical compensation layer 151 is disposed between the substrate 110 and the covering substrate 170. The adhesive layer 160 in this embodiment may include a thermal curing adhesive, an ultraviolet (UV) curing adhesive, a liquid optical clear adhesive (OCA), or a pressure sensitive adhesive (PSA), but not limited thereto. The covering substrate 170 may include a cover lens or a cover glass so as to protect each component in the touch panel 102, but not limited thereto. Apart from the adhesive layer 160 and the covering substrate 170 in this embodiment, the other components, allocations, material properties, and methods of tuning the thickness and the refraction index of each layer in this embodiment are similar to those of the touch panel 101 in the first preferred embodiment detailed above and will not be redundantly described. It is worth noting that, in this embodiment, a refraction index of the covering substrate 170 is smaller than the refraction index of the optical compensation layer 151, and a refraction index of the adhesive layer 160 is smaller than the refraction index of the optical compensation layer 151 so as to generate a better optical effect. More specifically, a relationship of the refraction indexes between the optical compensation layer 151, the first axis sensing electrode 121, the adhesive layer 160, and the covering substrate 170 may be referred in equation (I) listed below, wherein a refraction index N stands for the refraction index of the optical compensation layer 151, a refraction index N1 stands for the refraction index of the first axis sensing electrode 121, a refraction index N2 stands for the refraction index of the adhesive layer 160, and a refraction index N3 stands for the refraction index of the covering substrate 170.

$$N2 \leq N3 < N \leq N1 \tag{I}$$

The issue of the visible transparent sensing electrodes in the touch panel may be improved by tuning the material of each layer according to the equation (I), but not limited thereto. Additionally, the touch panel 102 in this embodiment and the touch panel 101 in the first preferred embodiment may be regarded as a kind of single ITO (SITO) touch panel.

Figure 4:
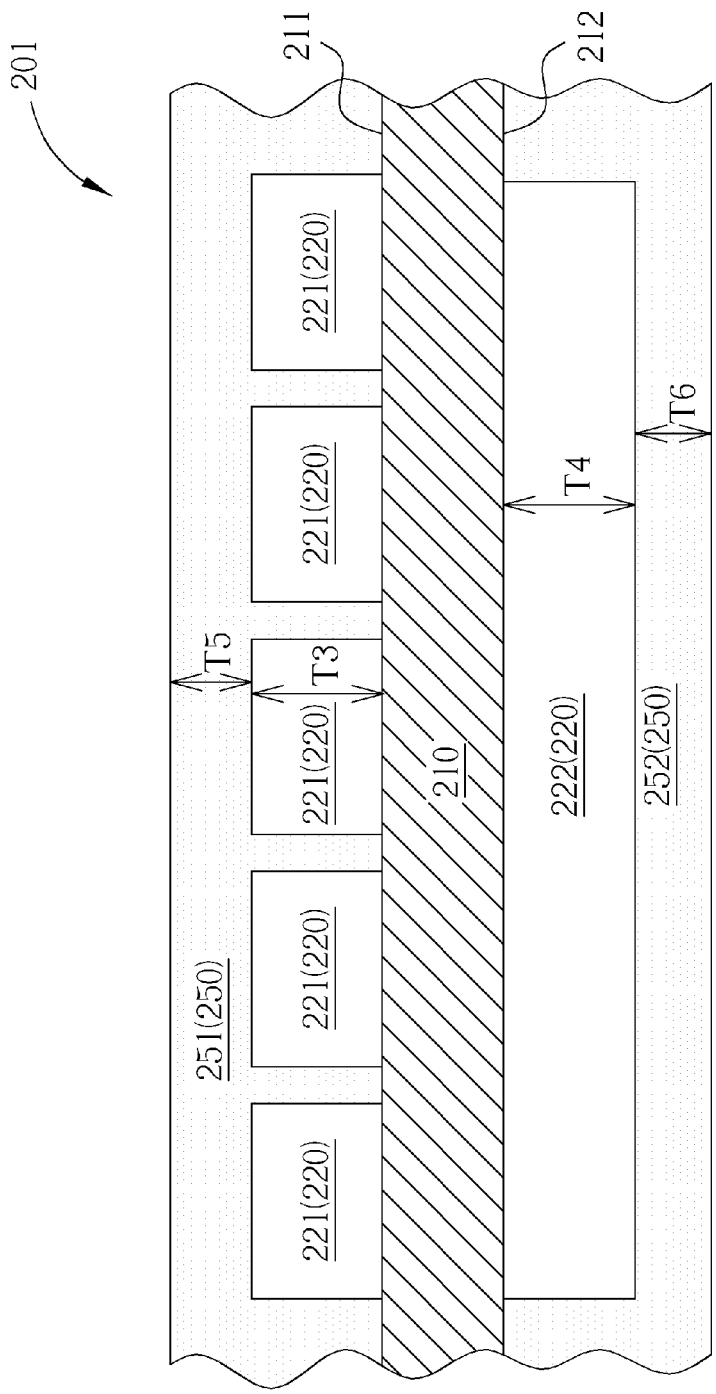
FIG. 4 is a schematic diagram illustrating a touch panel according to a third preferred embodiment of the present invention.

Please refer to FIG. 4. FIG. 4 is a schematic diagram illustrating a touch panel according to a third preferred embodiment of the present invention. As shown in FIG. 4, a touch panel 201 in this embodiment includes a substrate 210, a touch sensing electrode 220, and an optical compensation layer 250. The difference between the touch panel 201 of this embodiment and the touch panel 101 of the first preferred embodiment is that the touch sensing electrode 220 in this embodiment includes a first axis sensing electrode 221 and a second axis sensing electrode 222 respectively disposed on two opposite surfaces of the substrate 210. The first axis sensing electrode 221 and the second axis sensing electrode 222 are stripe pattern electrodes. More specifically, the first axis sensing electrode 221 is disposed on a first surface 211 of the substrate 210, and the second axis sensing electrode 222 is disposed on a second surface 212 of the substrate 210. Additionally, the optical compensation layer 250 includes a first optical compensation layer 251 and a second optical compensation layer 252. The first optical compensation layer 251 is disposed on the first surface 211 of the substrate and covers the first axis sensing electrode 221. The second optical compensation layer 252 is disposed on the second surface 212 of the substrate 210 and covers the second axis sensing electrode 222. In this embodiment, a refraction index of the optical compensation layer 250 is smaller than or equal to a refraction index of the touch sensing electrode 220, i.e. a refraction index of the first optical compensation layer 251 is smaller than or equal to a refraction index of the first axis sensing electrode 221, and a refraction index of the second optical compensation layer 252 is smaller than or equal to a refraction index of the second axis sensing electrode 222. For example, the refraction index of the first axis sensing electrode 221 is between 1.7 and 2.0, the refraction index of the second axis sensing electrode 222 is between 1.7 and 2.0, the refraction index of the first optical compensation layer 251 is between 1.6 and 1.7, and the refraction index of the second optical compensation layer 252 is between 1.6 and 1.7. In addition, the refraction index of the first axis sensing electrode 221 may be substantially equal to the refraction index of the second axis sensing electrode 222, and the refraction index of the first optical compensation layer 251 may be substantially equal to the refraction index of the second optical compensation layer 252, but the present invention is not limited to this. The first axis sensing electrode 221 and the second axis sensing electrode 222 with different refraction indexes, or the first optical compensation layer 251 and the second optical compensation layer 252 with different refraction indexes may also be employed in other preferred embodiments of the present invention. It is worth noting that a thickness T3 of the first axis sensing electrode 221 is preferably between 18 nanometers and 150 nanometers, a thickness T4 of the second axis sensing electrode 222 is preferably between 18 nanometers and 150 nanometers, a thickness T5 of the first optical compensation layer 251 covering the first axis sensing electrode 221 is preferably between 60 nanometers and 150 nanometers, and a thickness T6 of the second optical compensation layer 252 covering the second axis sensing electrode 222 is preferably between 60 nanometers and 150 nanometers, but not limited thereto. In other preferred embodiments of the present invention, the thickness of the touch sensing electrode 220 may be larger than 90 nanometers, but not limited thereto. Additionally, a relationship between the thickness T3 of the first axis sensing electrode 221 and the thickness T5 of the first optical compensation layer 251 covering the first axis sensing electrode 221 and a relationship between the thickness T4 of the second axis sensing electrode 222 and the thickness T6 of the second optical compensation layer 252 covering the second axis sensing electrode 222 are similar to those in the first preferred embodiment detailed above and will not be redundantly described. In addition, the first optical compensation layer 251 and the second optical compensation layer 252 in this embodiment may include organic materials, such as polyimide and acrylic resin, inorganic materials, such as titanium oxide, a single layer structure of the above-mentioned materials, or a stack layer of the above-mentioned materials. The first optical compensation layer 251 and the second optical compensation layer 252 may be formed by dry coating methods, such as chemical vapor deposition, or wet coating methods, such as spin on coating, but not limited thereto. The thickness of the second optical compensation layer 252 may be equal to the thickness of the first optical compensation layer 251, and the materials of the second optical compensation layer 252 may be identical to the materials of the first optical compensation layer 251, but the present invention is not limited to this, and the first optical compensation layer 251 and the second optical compensation layer 252 with different materials and different thicknesses may also be employed in other embodiments of the present invention. Apart from the second optical compensation layer 252 and the allocations of the first axis sensing electrode 221 and the second axis sensing electrode 222 in this embodiment, the other components, allocations, material properties, and methods of tuning the thickness and the refraction index of each layer in this embodiment are similar to those of the touch panel 101 in the first preferred embodiment detailed above and will not be redundantly described. Additionally, in this embodiment, an insulating film (not shown) may be selectively disposed between the substrate 210 and the first axis sensing electrode 221, and another insulating film (not shown) may be selectively disposed between the substrate 210 and the second axis sensing electrode 222 so as to improve the touch operations on the touch panel 201, but not limited thereto.

Figure 5:
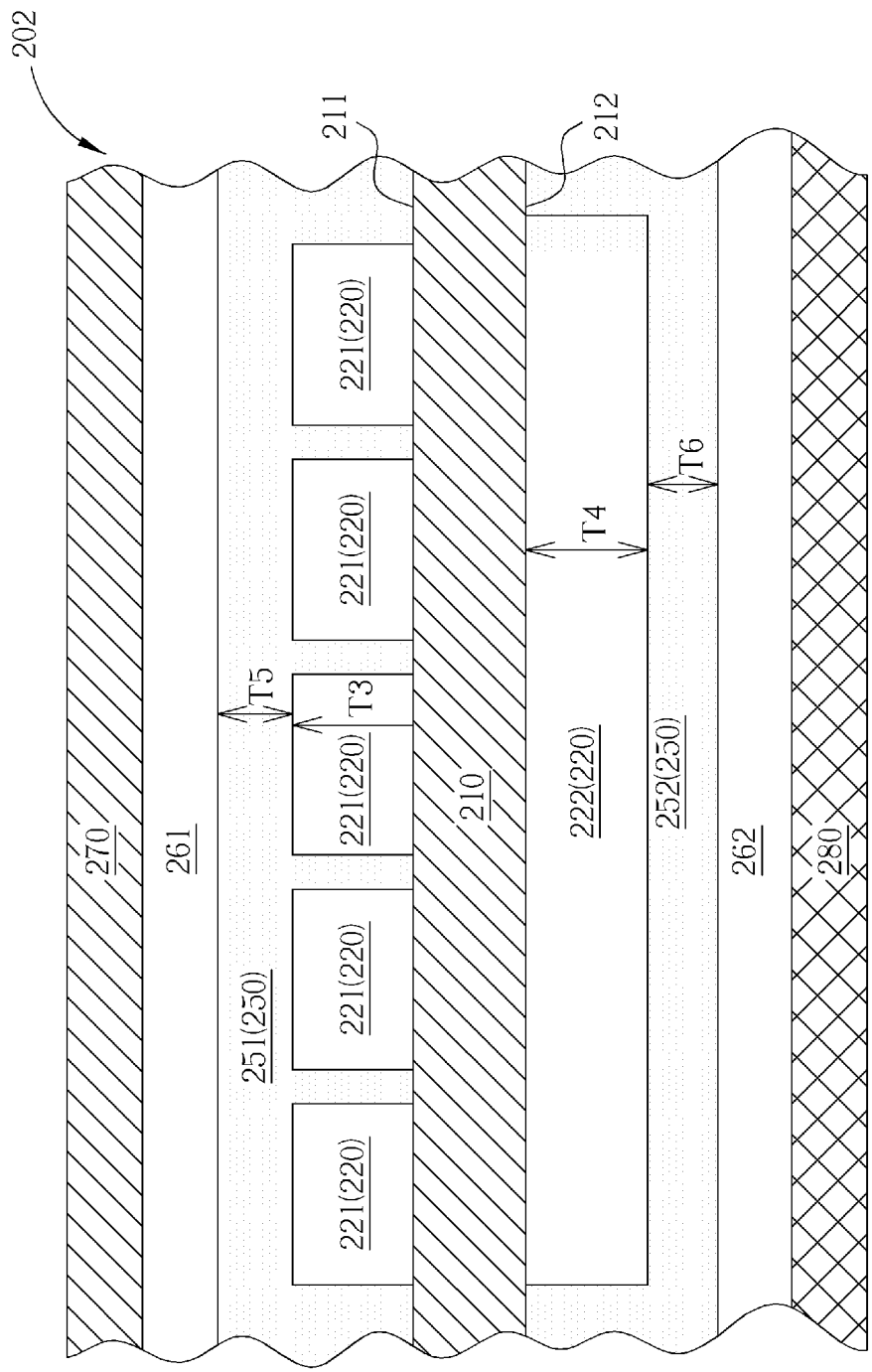
FIG. 5 is a schematic diagram illustrating a touch panel according to a fourth preferred embodiment of the present invention.

Please refer to FIG. 5. FIG. 5 is a schematic diagram illustrating a touch panel according to a fourth preferred embodiment of the present invention. As shown in FIG. 5, the difference between a touch panel 202 of this embodiment and the touch panel 201 of the third preferred embodiment is that the touch panel 202 further includes two adhesive layers (one adhesive layer 261 and one adhesive layer 262), a covering substrate 270, and a protection layer 280. The two adhesive layers are respectively disposed on the first optical compensation layer 251 and the second optical compensation layer 252. The covering substrate 270 and the protection layer 280 are respectively disposed on the two adhesive layers. In other words, the adhesive layer 261 and the covering substrate 270 are disposed on the first surface 211 of the substrate 210, and the adhesive layer 262 and the protection layer 280 are disposed on the second surface 212 of the substrate 210. The adhesive layer 261 is employed to combine the covering substrate 270 and the first optical compensation layer 251, and the adhesive layer 262 is employed to combine the protection layer 280 and the second optical compensation layer 252. In this embodiment, a refraction index of the adhesive layers is smaller than the refraction index of the optical compensation layer 250, i.e. a refraction index of the adhesive layer 261 is smaller than the refraction index of the first optical compensation layer 251, and a refraction index of the covering substrate 270 is smaller than the refraction index of the first optical compensation layer 251. The adhesive layer 261 and the adhesive layer 262 may include thermal curing adhesives, ultraviolet curing adhesives, liquid optical clear adhesives, or pressure sensitive adhesives, but not limited thereto. The protection layer 280 in this embodiment may include plastics, such as polyethylene terephthalate (PET), polyethersulfone (PES), polyimide (PI), polycarbonate (PC), polyethylene naphthalate (PEN), polymethyl methacrylate (PMMA), glass, or the materials mentioned above coated with organic or inorganic functional coatings, but not limited thereto. Apart from the adhesive layer 261, the adhesive layer 262, the covering substrate 270, and the protection layer 280 in this embodiment, the other components, allocations, material properties, and methods of tuning the thickness and the refraction index of each layer in this embodiment are similar to those of the touch panel 201 in the third preferred embodiment detailed above and will not be redundantly described. It is worth noting that the touch panel 201 in the third preferred embodiment and the touch panel 202 in this embodiment may be regarded as a kind of double ITO (DITO) touch panel because the first axis sensing electrode 221 and the second axis sensing electrode 222 are disposed on different surfaces of the substrate 210 in the touch panel 202 of this embodiment and the touch panel 201 in the third preferred embodiment detailed above.

Figure 6:
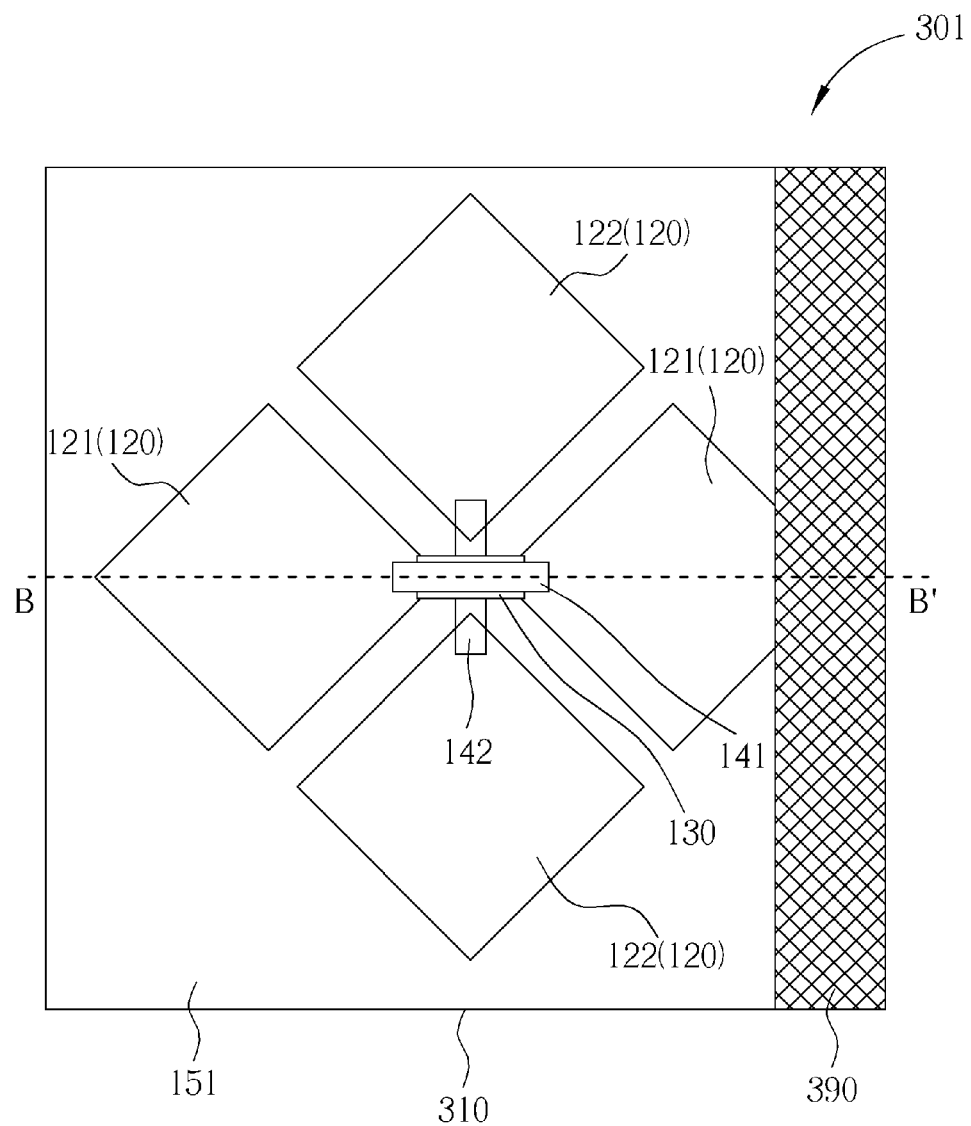
FIG. 6 and FIG. 7 are schematic diagrams illustrating a touch panel according to a fifth preferred embodiment of the present invention.
Figure 7:
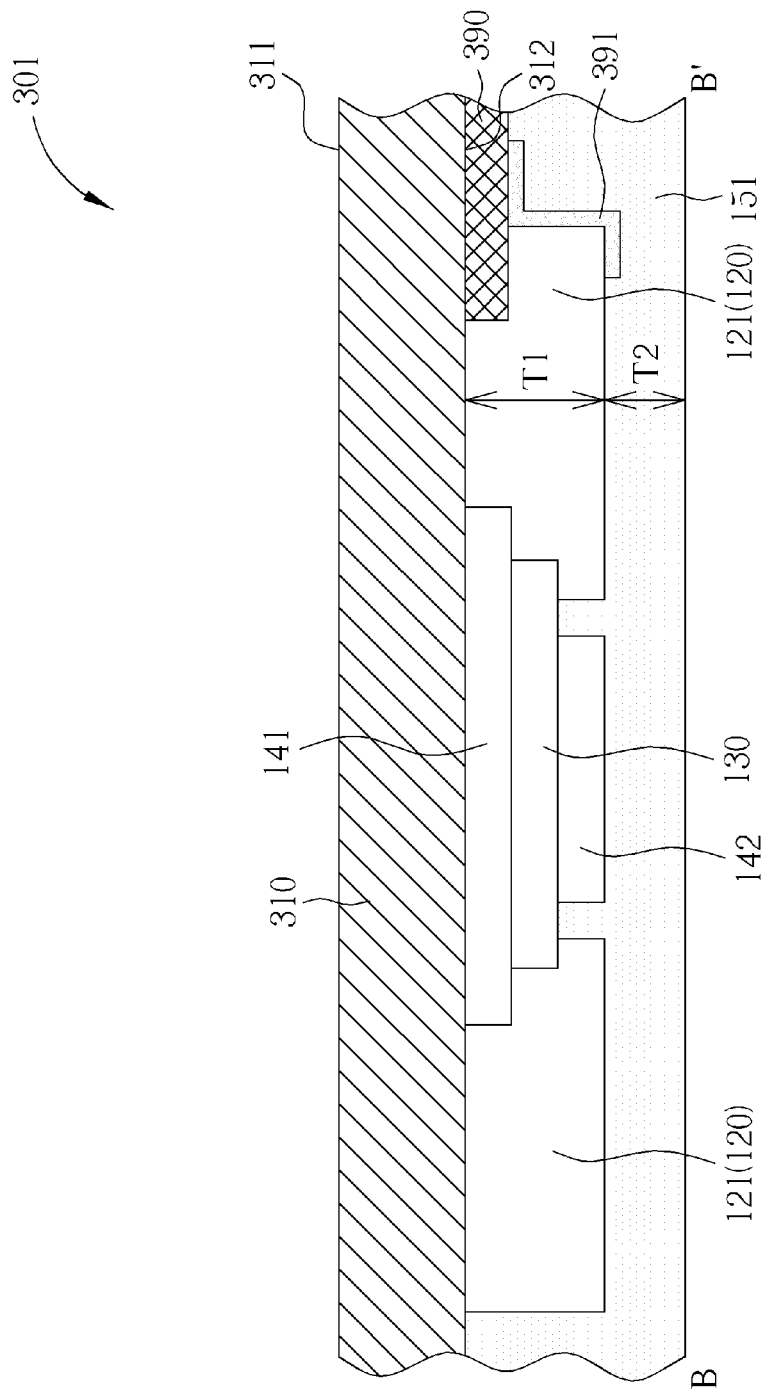

Please refer to FIG. 6 and FIG. 7. FIG. 6 and FIG. 7 are schematic diagrams illustrating a touch panel according to a fifth preferred embodiment of the present invention. FIG. 6 is a top-view diagram. FIG. 7 is a cross-sectional view diagram taken along a cross-sectional line B-B' in FIG. 6. As shown in FIG. 6 and FIG. 7, the difference between a touch panel 301 of this embodiment and the touch panel 101 of the first preferred embodiment is that, in the touch panel 301 of this embodiment, the first axis sensing electrodes 121, the second axis sensing electrodes 122, the first connecting line 141, the second connecting line 142, the insulating layer 130, and the optical compensation layer 151 are all disposed on a second surface 312 of a substrate 310. A first surface 311 of the substrate 310, which is disposed oppositely to the second surface 312, may be regarded as a touch surface, but not limited thereto. Additionally, the touch panel 301 in this embodiment further includes a decoration layer 390 and a conductive line 391. The decoration layer 390 is disposed on an edge of the substrate 310. The decoration layer 390 may preferably include a ceramic material, a diamond like carbon material, a color ink, a photo resist or a resin, but not limited thereto. The conductive line 391 is disposed on the edge of the substrate 310. The conductive line 391 is electrically connected to the touch sensing electrode 120, and the touch signals may be transmitted to the touch sensing electrode 120 through the conductive line 391. The decoration layer 390 may be used to shield the conductive line 391, but not limited thereto. Apart from the substrate 310, the decoration layer 390, and the conductive line 391 in this embodiment, the other components, allocations, material properties, and methods of tuning the thickness and the refraction index of each layer in this embodiment are similar to those of the touch panel 101 in the first preferred embodiment detailed above and will not be redundantly described. It is worth noting that the substrate 310 in this embodiment may be a glass substrate or a plastic substrate, but the present invention is not limited to this. For example, the substrate 310 may preferably include a cover lens or a cover glass. Compared to the structure of the touch panel 101 in the first preferred embodiment detailed above, the touch panel 301 in this embodiment may become relatively thinner and the corresponding manufacturing process may be simplified because the substrate 310 may be a cover lens or a cover glass, and no additional covering substrates are required. In addition, an insulating film (not shown) may be selectively disposed on between the substrate 310 and the first axis sensing electrode 121 so as to improve touch operations on the touch panel 301, but not limited thereto.

Figure 8:
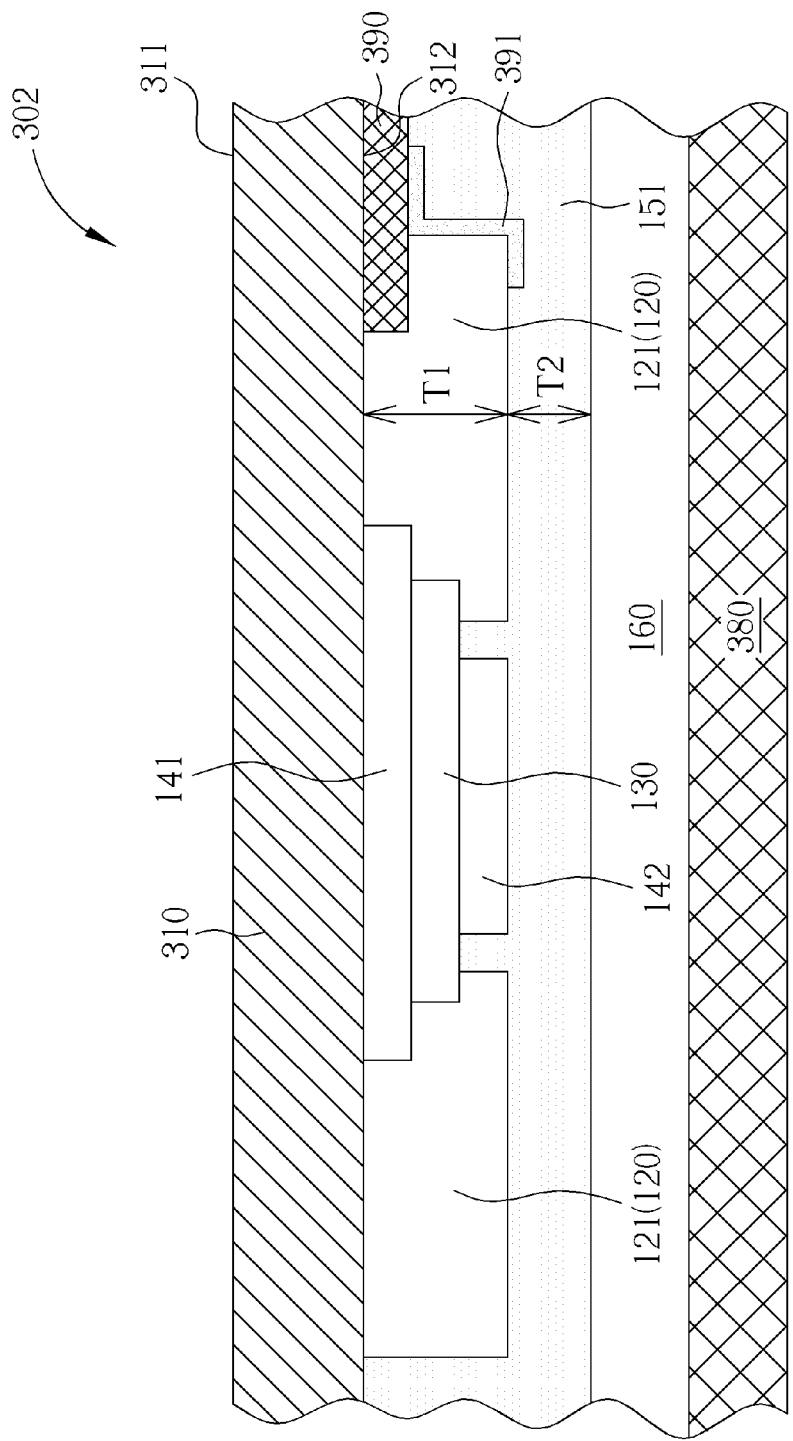
FIG. 8 is a schematic diagram illustrating a touch panel according to a sixth preferred embodiment of the present invention.

Please refer to FIG. 8. FIG. 8 is a schematic diagram illustrating a touch panel according to a sixth preferred embodiment of the present invention. As shown in FIG. 8, the difference between a touch panel 302 of this embodiment and the touch panel 301 of the fifth preferred embodiment is that the touch panel 302 further include an adhesive layer 160 and a protection layer 380 disposed on the second surface 312 of the substrate 310. The adhesive layer 160 is disposed on the optical compensation layer 151, and the protection layer 380 is disposed on the adhesive layer 160. In other words, the adhesive layer 160 is disposed between the optical compensation layer 151 and the protection layer 380 so as to combine the optical compensation layer 151 and the protection layer 380. The protection layer 380 in this embodiment may include plastics, such as polyethylene terephthalate, polyethersulfone, polyimide, polycarbonate, polyethylene naphthalate, polymethyl methacrylate, glass, or the materials mentioned above coated with organic or inorganic functional coatings, but not limited thereto. The adhesive layer 160 in this embodiment may include a thermal curing adhesive, an ultraviolet curing adhesive, a liquid optical clear adhesive, or a pressure sensitive adhesive, but not limited thereto. It is worth noting that, in this embodiment, a refraction index of the adhesive layer 160 is smaller than the refraction index of the optical compensation layer 151 so as to generate better optical effect. Apart from the adhesive layer 160 and the protection layer 380 in this embodiment, the other components, allocations, material properties, and methods of tuning the thickness and the refraction index of each layer in this embodiment are similar to those of the touch panel 301 in the fifth preferred embodiment detailed above and will not be redundantly described.

To summarize the above descriptions, in the present invention, at least one optical compensation layer is disposed in the touch panel, and the refraction index and the thickness of the optical compensation layer may be adjusted to the touch sensing electrode so as to overcome the issue of the visible touch sensing electrodes in the touch panel, which may be generated by increasing the thickness of the touch sensing electrode. The total transmittance of the touch panel may also be increased by the optical compensation layer, and the appearance quality of the touch panel may be accordingly enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate having a first surface and a second surface opposite to the first surface, wherein the first surface is a touch surface;
   a touch sensing electrode, comprising:
   a plurality of first axis sensing electrodes disposed on the second surface of the substrate; and
   a plurality of second axis sensing electrodes disposed on the second surface of the substrate;
   an optical compensation layer, directly disposed on the second surface of the substrate and covering the touch sensing electrode, wherein a refraction index of the optical compensation layer is smaller than or equal to a refraction index of the touch sensing electrode;
   an adhesive layer disposed on the optical compensation layer; and
   a protection layer disposed on the adhesive layer, wherein a refraction index of the adhesive layer is smaller than the refraction index of the optical compensation layer.

2. The touch panel of claim 1, wherein a refraction index of the first axis sensing electrodes and the second axis sensing electrodes is between 1.7 and 2.0, and the refraction index of the optical compensation layer is between 1.6 and 1.7.

3. The touch panel of claim 1, wherein the touch sensing electrode comprises a thickness between 18 nanometers and 150 nanometers, and the optical compensation layer comprises a thickness between 60 nanometers and 150 nanometers.

4. The touch panel of claim 1, wherein the substrate includes a cover lens or a cover glass.

5. The touch panel of claim 4, further comprising a decoration layer, disposed on an edge of the substrate, wherein the decoration layer comprises ceramic material, diamond like carbon material, color ink, photo resist, or resin.

6. The touch panel of claim 1, wherein the adhesive layer comprises a thermal curing adhesive, an ultraviolet curing adhesive, a liquid optical clear adhesive, or a pressure sensitive adhesive.

7. The touch panel of claim 1, wherein a thickness of the touch sensing electrode is 110 nanometers, and a thickness of the optical compensation layer is 60 nanometers.

8. The touch panel of claim 1, wherein a thickness of the touch sensing electrode is 110 nanometers, and a thickness of the optical compensation layer is 70 nanometers.

\* \* \* \* \*